United States Patent Office 3,559,508
Patented Feb. 2, 1971

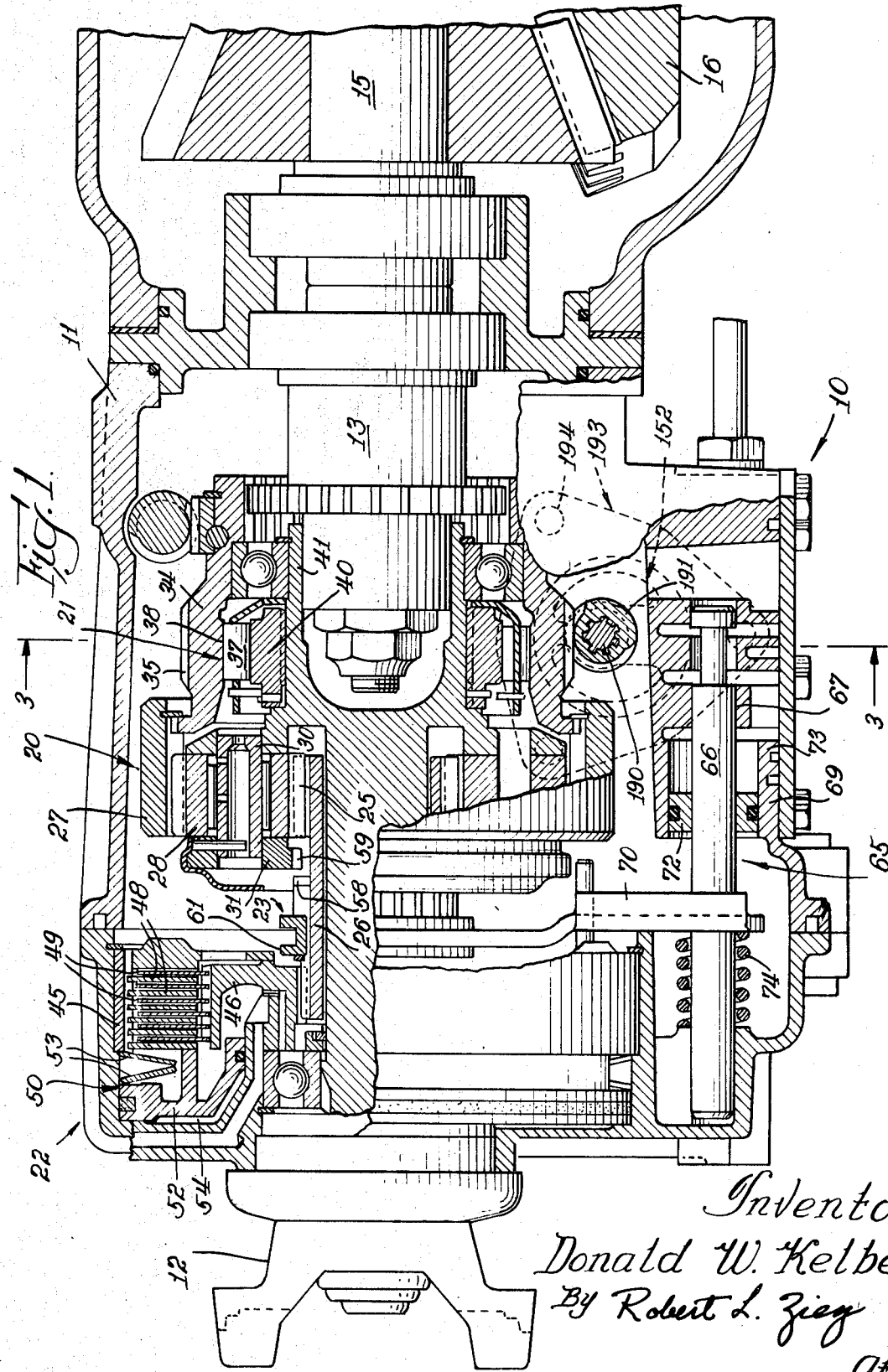

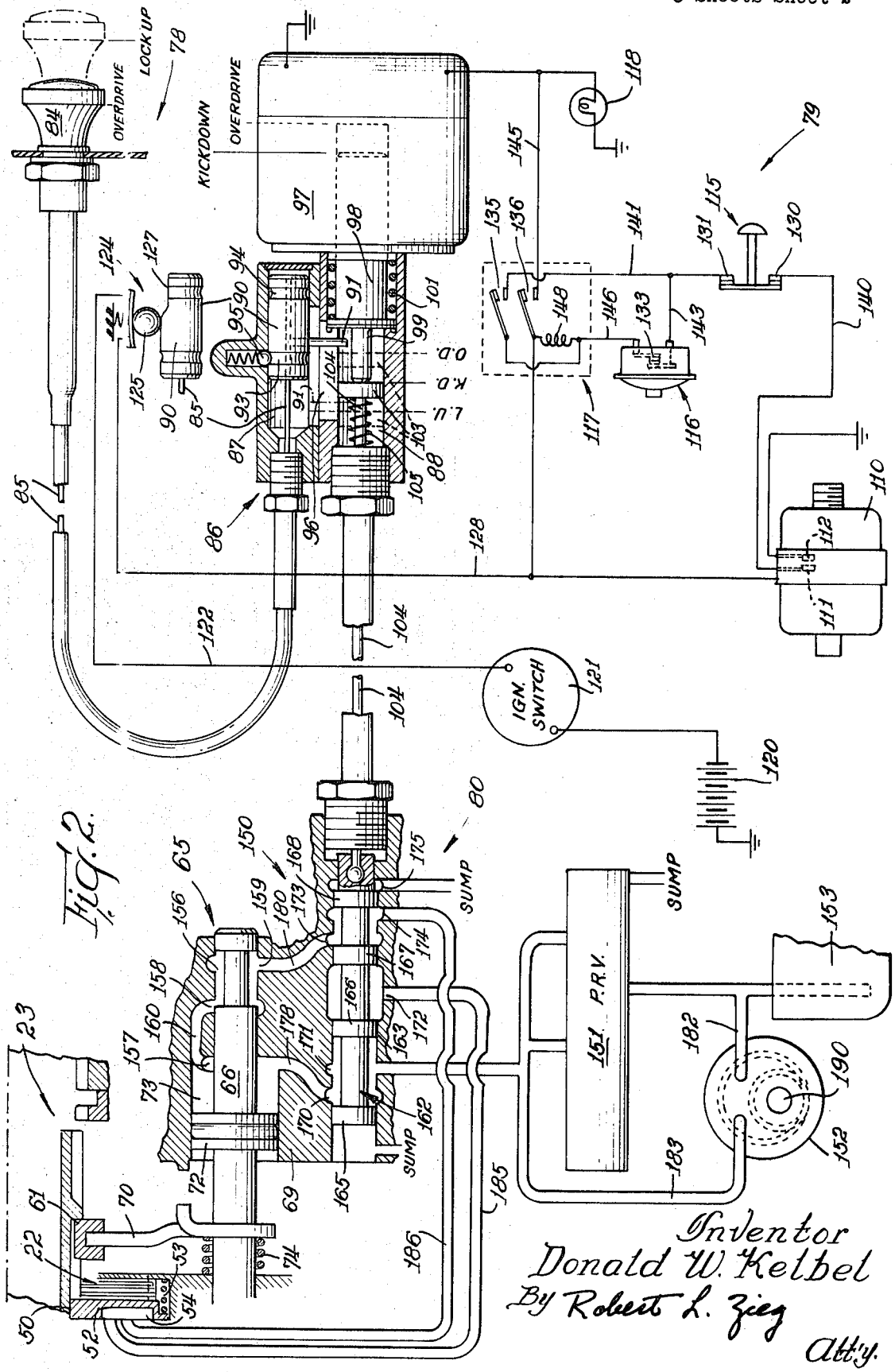

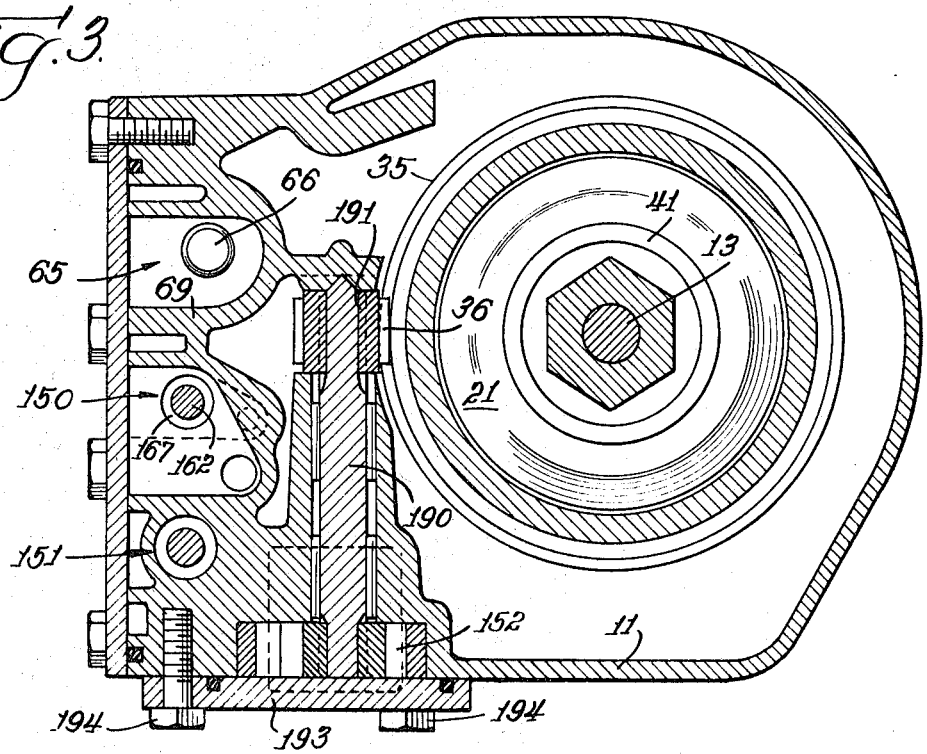
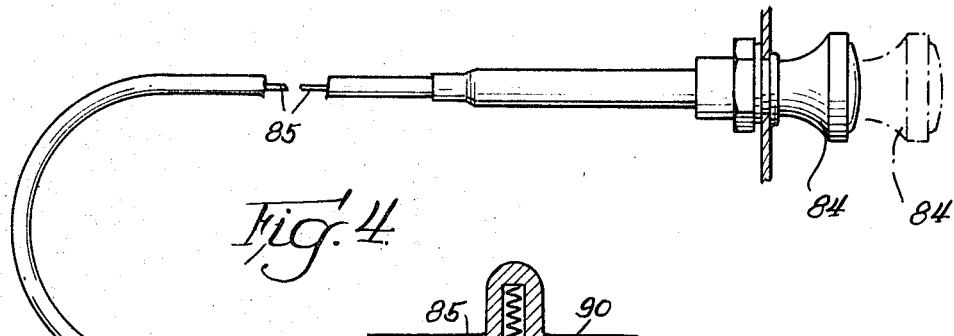
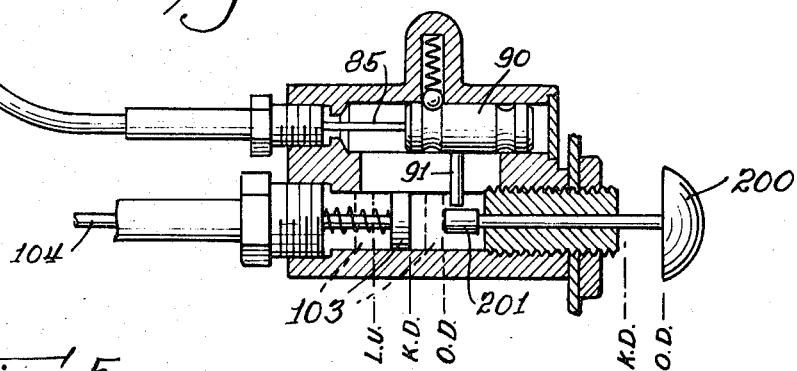
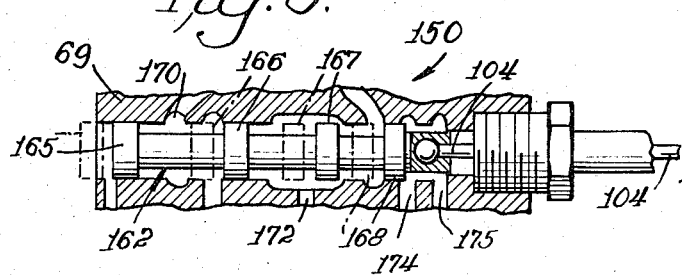

1

3,559,508
OVERDRIVE TRANSMISSION
Donald W. Kelbel, Muncie, Ind., assignor to Borg-Warner
Corporation, Chicago, Ill., a corporation of Delaware
Filed Jan. 6, 1969, Ser. No. 789,339
Int. Cl. B60k 21/10; F16h 3/44, 5/42
U.S. Cl. 74—864                                13 Claims

ABSTRACT OF THE DISCLOSURE

A self-contained vehicle overdrive transmission for mounting adjacent the differential mechanism including a hydraulic control system providing selective or full automatic change from lockup condition to overdrive and vice versa under full power conditions.

SUMMARY OF THE INVENTION

The present invention comprises an overdrive transmission mounted remote from the main vehicle transmission and in the preferred embodiment illustrated, the overdrive unit is mounted adjacent the differential unit. An improved fluid and electric control system is provided for the overdrive unit. The control system includes a fluid actuated friction device which can be actuated under full load conditions for changing the overdrive unit between freewheel 1:1 ratio and overdrive ratio and vice versa. A fluid actuator is provided to establish a 1:1 lockup ratio or to condition the device for either 1:1 freewheel or overdrive and the fluid actuator is part of a fluid interlock circuit which insures that the friction device to provide overdrive ratio cannot be actuated unless the lockup ratio is released. The fluid pressure for the control system and lubrication of the unit is provided by a gear driven pump contained in the overdrive unit case.

DESCRIPTION OF DRAWINGS

The invention consists of the novel constructions, arrangements and devices to be hereinafter described and claimed for carrying out the above stated objects and such other objects as will be apparent from the following description of a preferred embodiment of the invention illustrated with reference to the accompanying drawings wherein:

FIG. 1 is a view partially in section of a combined transmission and a differential mechanism of the present invention;

FIG. 2 is a schematic view of the control system for the transmission of the present invention;

FIG. 3 is a sectional view taken along line 3—3 of FIG. 1;

FIG. 4 is a view showing a modified form of control system; and

FIG. 5 is a view showing the kickdown and lockup positions of the manual selector valve of FIG. 2.

DESCRIPTION OF PREFERRED EMBODIMENT

Referring now to the drawings and more particularly to FIG. 1, the overdrive apparatus of the invention is indicated generally by the reference numeral 10 and includes an overdrive unit housing 11, an input shaft 12 and an output shaft 13 to which is secured a pinion gear 15 in mesh with a ring gear 16 which forms a part of a conventional differential unit (not illustrated). The overdrive unit housing 11 contains a planetary gear set 20, a one-way cltuch unit 21, a friction type brake 22 and a positive type clutch 23.

The planetary gear set 20 includes a sun gear 25 formed on a hollow sleeve shaft 26, a ring gear 27, and a plurality of planet gears 28 meshing with the sun and ring gears,

2 each of which is mounted for rotation on a shaft 30. The shafts 30 are mounted in circumferentially spaced relation on a carrier 31 which is connected to the input shaft 12. It will be noted that the sun gear 25 is rotatably disposed on the input shaft 12 and that the ring gear 27 is drivingly connected to the output shaft 13 through a sleeve 34. The sleeve 34 has external teeth 35 formed thereon to drive a fluid pump, as will be later described.

The one-way clutch unit 21 comprises a plurality of circumferentially spaced rollers 37 disposed between an internal cylindrical surface 38 formed on the interior sleeve 34 and the periphery of a collar 40 which is splined to a hub 41 forming a part of the input shaft 12. The outer periphery of the collar 40 is formed with a plurality of circumferentially spaced cam surfaces, one for each of the rollers 37.

The brake 22 is a multiple disc device which is fluid pressure applied and spring released and includes a splined member 45 secured in the housing 11 of the overdrive unit. A splined hub 46 is also provided which is drivingly connected to the sun gear sleeve shaft 26. A plurality of brake discs 48 are drivingly connected to the member 45 and a plurality of interleaved brake discs 49 are provided which are drivingly connected to the hub 46. A fluid chamber 50 is formed in the housing which has mounted therein a fluid piston 52. A return spring 53 is provided between the piston and the member 45 which is operative to return the piston. The piston 52 being mounted in the chamber 50 forms an apply chamber 54 which is suitably connected to the hydraulic control system by fluid conduits for actuation of the piston 52 and engagement of brake 22 when selected by the control system. Control of the apply pressure will be discussed hereinafter. The brake has for its purpose the holding of sun gear 25 stationary as a reaction point for the planetary gear set, thus causing the gear set to provide an overdrive ratio.

The positive clutch 23 comprises a series of splined teeth 58 formed on the sun gear shaft 26, and a series of splined teeth 59 are provided on the planetary carrier member 31. A shift collar 61 is provided which is axially fixed on the sun gear shaft 26 whereby when the collar is moved to the right by a shift fork to be later described, the teeth 58 will engage the teeth 59 to provide a locked up condition of the gear set whereby the carrier and sun gears are locked together to provide a 1:1 two-way drive through the gear set.

The means for engaging and disengaging the clutch 23 is also illustrated in FIG. 1 which comprises a shift valve or means 65. The valve 65 includes a spool 66 which is slidable in a bore 67 provided in a valve body 69 for the unit. Provided on the spool 66 is a shift fork 70 which engages the shift collar 61 and when moved can thereby engage and disengage the clutch 23. Affixed to the valve spool 66 is a fluid piston 72 which is slidable in a chamber 73 formed in the valve body 69. A spring 74 is provided in the valve body 69 urging the shift valve 65 to the right as viewed in FIG. 1 whereby it can be seen that when fluid pressure is not supplied to the chamber 73 the spring 74 will be operative to move the shift valve to the right thereby engaging positive clutch 23 to provide 1:1 drive ratio.

Referring to FIG. 2, the control system for the overdrive transmission of the present invention is illustrated. The control system as generally indicated includes a manual section 78, an electric section 79, and a hydraulic section 80.

The manual section 78 includes a handle 84 to be provided in the passenger vehicle compartment which has overdrive and lockup positions. Handle 84 controls a cable 85. The cable 85 is attached to a control block 86 which is adapted to be mounted in the engine compartment of the vehicle. The control block 86 has a pair of bores 87 and 88 provided therein. Manual cable 85 is attached to a sliding block 90 provided in the bore 87. The block 90 carrying a pin which is adapted to influence control of the overdrive unit, as will be explained. The sliding block 90 has overdrive and lockup positions and the block 90 has a pair of grooves 93 and 94 adapted to be engaged by a spring urged ball 95 which serves as a detent to hold the sliding block 90 in its overdrive or lockup position.

A slot 96 is provided in the control block 86 through which the pin 91 carried by the sliding block 90 may extend into the bore 88. A solenoid 97, which is a part of the electrical control system 79, is mounted on the control block 86. The solenoid 97 has an armature 98 having a pin 99 extending axially therefrom. A spring 101 acts on the armature to move it to the left to its kickdown position when the solenoid is deenergized. Slidable in the bore 88 is an end member 103 for a cable 104 which connects the solenoid unit to a valve in the hydraulic control system 80 as will be later described.

A spring 105 is provided adapted to move the member 103 and cable 104 to the right when the solenoid has moved pin 99 to the right.

As will be apparent in FIG. 2, when the handle 84 is pulled to the right to its lockup position, sliding block 90 will move to the left and locate pin 91 to the left whereby member 103 and cable 104 will not be able to move to the overdrive position shown in dotted lines and labeled O.D. even though the armature 98 is in its righthand position since pin 91 will be blocking movement of member 103.

Electrical control system 79 includes a governor mechanism 110 adapted to be connected to the speedometer cable which has a pair of contacts 111 and 112 therein which will close at a predetermined vehicle speed. Also provided is a kickdown switch 115, vacuum switch 116, an overdrive relay 117, a lamp 118 and solenoid 97 already described. A battery 120 is illustrated next to the ignition switch 121. Ignition switch 121 is connected to the contacts of a position switch 124 which comprises a ball 125 adapted to be moved radially outwardly when the sliding block 90 is in the position illusttrated, moving the ball out of a reduced portion 127 of the sliding block 90. A wire 128 connects the position switch 124 to the electric governor 110 and to the overdrive relay 117. Kickdown switch 115 includes a pair of contacts 130 and a pair of contacts 131. Vacuum switch 116 has a pair of contacts 133. Overdrive relay 117 has a pair of contacts 135 and a pair of contacts 136. A wire 140 connects contact 111 of governor 110 with contacts 130 of kickdown switch 115. Wire 141 connects contact 131 of kickdown switch 115 with contacts 135 of the overdrive relay 117. A wire 143 connects wire 141 to contacts 133 of vacuum switch 116. A wire 145 connects contacts 136 of the overdrive relay to the lamp 118 and solenoid 97. A wire 146 connects contacts 133 of vacuum switch 116 with an ovedrive relay coil 148 provided in the relay 117 and with contacts 135 in the overdrive relay 117.

The hydraulic control system 80 includes the shift means or valve 65 as has been described above, and further includes a selector valve 150 and regulator valve 151, a fluid pump 152 and a fluid sump 153.

All of the components of the hydraulic control system are mounted in the valve body 69 as schematically illustrated in FIG. 2 and as will appear in the section view shown in FIG. 3. The shift valve 65 includes a groove 156 and the valve body is provided with ports 157, 158 and 159. Ports 157 and 158 are interconnected by conduit 160. Selector valve 150 includes a valve spool 162 slidable in a bore 163 provided in the valve body 69 and the valve has lands 165, 166, 167 and 168 thereon. Provided in the bore 163 for the selector valve 150 are ports 170, 171, 172, 173, 174 and 175. Port 170 is connected to port 157 of the shift valve by conduit 178. Port 175 is connected to sump. Port 173 is connected to port 159 of the shift valve by conduit 180.

The regulator valve 151 has been shown in schematic form since any known type of regulating valve adapted to keep a source of supply at a constant pressure can be used. The pump 152 is illustrated as one of the crescent type although other types of pumps can be used. A conduit 182 connects sump 153 to pump 152 and to the regulating valve 151. Conduit 183 is provided which is connected to the outlet of the pump 152 and is thereby the pressure supply conduit which is connected to the regulating valve 151 and to port 171 of selector valve 150. A conduit 185 is connected to port 172 of selector valve 150 and has an open end at a point near the clutch collar 61 and radially inwardly of the brake discs of brake 22 to serve as a lubrication line for the brake. A conduit 186 is provided which connects port 174 of selector valve 150 to apply chamber 54 of brake 22.

Referring to FIG. 3, the location of pump 152 is indicated which is radially offset from the overdrive gear set. The pump is driven by shaft 190 which has a gear 191 thereon which is in engagement with the gear teeth 35 provided on the sleeve 34 which is connected to output shaft 13. Thus pump 152 is operated in dependence upon the rotation of the output shaft 13 and is only effective to pump fluid when the output shaft 13 is rotating. An access cover 193 is provided on the housing 11 whereby bolts 194 can be removed and cover 193 can be removed to service the fluid pump 152 without disassembly of the overdrive unit. This is made possible by the use of the radially extending shaft 190 as a pump drive.

OPERATION

Assuming the operator of the vehicle has placed the handle 84 in the overdrive position as illustrated in FIG. 3, sliding block 90 will move to the right as illustrated in FIG. 2. This will place pin 91 in its righthand position thus conditioning the control block 86 for overdrive operation enabling cable 104 and member 103 to move to the right to the dotted line position labeled O.D. when armature 98 and pin 99 are moved to the right by solenoid 97. When the vehicle reaches a predetermined speed as determined by governor 110 driven by the vehicle speedometer a circuit will be completed by closing of contacts 111 and 112 from ignition switch 121 to wire 122, position switch 124, wire 128, relay coil 148, wire 146, contacts 133, wire 143, wire 141, kickdown switch 115 and wire 140 through contacts 111, 112 to ground.

Thus the relay coil 148 will be energized pulling the pairs of contacts 135 and 136 into engagement, completing a circuit from wire 128 through contacts 136 and wire 145 to solenoid 97. Solenoid 97 is actuated and armature 98 moves to the right to its overdrive position. Spring 105 can now move cable 104 and member 103 to the overdrive position marked O.D. in FIG. 2.

Prior to cable 104 moving to the overdrive position, it would be in the kickdown position labeled K.D. as illustrated in FIG. 2 and selector valve 150 would be in the position shown in solid lines in FIG. 5. The dotted line position of selector valve 150 in FIG. 5 is the lockup position corresponding to the "L.U." position of cable 104. In the kickdown position of valve 150 fluid pressure is admitted from conduit 183 through ports 171, 170, conduit 178 to chamber 73 to move the shift valve 65 to the left when sufficient vehicle speed has been obtained to provide pressure from the pump and thereby disengage positive clutch 23. At this time, the vehicle is operating in a 1:1 one-way drive ratio through the one-way clutch 21.

When the cable 104 moves to the overdrive position, selector valve 150 will be positioned as illustrated in FIG. 2. In this position fluid is admitted from port 157 of shift valve 65 through conduit 160, port 158, groove 156, port 159, conduit 180, port 173, the groove between lands 167 and 168, port 174 to the conduit 186 which admits fluid pressure to apply chamber 54 to apply friction brake 22 holding sun gear 25 stationary and providing the overdrive drive ratio. Only when the shift valve 65 is in the position illustrated in which clutch 23 is disengaged will port 158 be opened through groove 156 to port 159, thus providing a hydraulic interlock feature in that, regardless of the position of selector valve 150, friction brake 22 cannot be engaged until shift valve 65 is moved to its position disengaging clutch 23.

In the kickdown position of selector valve 150 port 173 communicates with port 172 through the groove between lands 167, 168. Pressure flowing through groove 156 and conduit 170 is thus admitted to conduit 185 which directs fluid to the clutch mechanism and the inner diameter of the brake discs to provide lubrication.

As can be seen from the illustration of FIG. 2, the overdrive solenoid 97 can be actuated only after contacts in the governor 110 and kickdown switch 115 and vacuum switch 116 are engaged. If the vehicle is under too great a load to be placed in overdrive ratio, contacts 133 of vacuum switch 116 will be open and prevent actuation of solenoid 97. After the solenoid has been actuated as can be seen from the diagram of FIG. 2, even if contacts 133 of the vacuum switch are opened this can not function to interrupt the circuit through the relay coil 148. Therefore once the overdrive ratio has been established the vacuum switch cannot operate to disengage overdrive ratio.

If the kickdown switch 115 is actuated to open its contacts or if vehicle speed drops below a predetermined level so as to open the contacts in governor 110, the circuit through the relay coil 148 will be interrupted and solenoid 97 deenergized. Spring 101 then will move armature 98 to the left forcing selector valve 150 to its kickdown position blocking port 174 and interrupting the flow of fluid to the brake 22. The transmission will then automatically be conditioned for 1:1 drive through one-way clutch 21.

The contacts in switch 124 are closed as illustrated in FIG. 2 since in the overdrive position of sliding block 90, ball 125 is moved out of the recessed area 127 and holds the contacts closed. If the operator of the vehicle wishes to select lockup position by pulling handle 84 this will operate to open the contacts in switch 124 by ball 125 moving into recessed area 127 thereby interrupting the flow of electrical energy to any of the electric control components and thereby preventing actuation of the solenoid 97 under any condition. When sliding block 90 moves to its lockup position pin 91 will be positioned as illustrated in dotted lines in FIG. 2 thereby moving member 103 and the cable 104 to the lockup position labelled L.U. in FIG. 2. In the lockup position of selector valve 150 illustrated in FIG. 5, land 166 blocks communication between ports 171 and 170 thus preventing flow of pressure to chamber 73, therefore spring 74 will be operative to move shift valve 65 to the right and engage positive clutch 23 and place the transmission in its lockup condition providing a 1:1 two-way driving ratio through the unit.

From the above it will be apparent that the present invention provides a unique and improved overdrive transmission for a vehicle which may be installed adjacent the rear axle and therefore can be installed in cars already on the road. Furthermore, the unit contains a complete gear set, its own source of pressure and the control valves in one housing. The unit is designed such that the valve body 69 can be cast integral with the housing to make a more economical arrangement. A unique arrangement of components is provided in that the manual control is placed in the driver's compartment and the solenoid and its connection to the transmission and the passenger compartment is mounted in the engine compartment so that the solenoid is protected from weather.

When operating in reverse it is necessary that the transmission be in its lockup condition since if the unit is conditioned for one-way 1:1 drive ratio in reverse, the one-way clutch will release and there will be no drive. The present invention conveniently provides that when rear wheels are not turning no fluid pressure is provided and thus the spring 74 can return to shift valve 65 to its lockup position to provide a two-way 1:1 drive so that reverse can be effected. Further, this lockup when at rest is effective to hold the vehicle when it is parked, contrary to prior art overdrives which are in freewheeling direct drive under these conditions.

Further, the above described improved overdrive transmission has a unique fluid pressure supply system in that a pump is provided located at the side of the transmission case and is driven by a radially extending shaft extending from the output shaft of the overdrive unit. In this way easy access is provided to the pump for servicing and further the unit can be made more compact utilizing some of the space available at the side of the transmission casing. Also, as above described, the unit advantageously has built into the selector valve and the shift valve a hydraulic interlock comprising the grove 156 on the shift valve and interconnecting conduits such that the friction brake to establish overdrive ratio can only be engaged after the clutch 23 is disengaged to prevent the friction brake being engaged at the same time the clutch is engaged.

Referring to FIG. 4, a modified embodiment is shown providing a semi-automatic mode of operation. In this construction the control block 86 does not have a solenoid connected thereto since in this version there are no electric controls. However, the hydraulic control system shown in FIG. 2 would be maintained. In this construction a kickdown button 200 is provided which replaces the solenoid 97. The button 200 has a plunger 201 thereon corresponding to armature 98 and pin 99 in the construction of FIG. 2. When the kickdown button 200 is released as in the position illustrated, the member 103 on the end of cable 104 can be returned by the spring 105 to the overdrive position illustrated in dotted lines in FIG. 4 and labeled O.D. When the transmission is placed in overdrive due to engagement of friction brake 22 by the hydraulic controls, a kickdown function can be made to take the transmission out of overdrive and effect a 1:1 one-way driving connection through the one-way clutch by depression of the button 200 which would move the plunger 201 and thereby move the member 103 to its kickdown position shown in dotted lines and labelled K.D. in FIG. 4. Thus the selector valve 150 will be moved to its kickdown position interrupting the flow of fluid to the apply chamber 54 of the friction brake thus releasing the brake. The sliding block 90 and manual handle 84 are identical in operation and function to that shown in FIG. 2 such that when the lockup position of handle 84 is selected as shown in dotted lines in FIG. 4, sliding block 90 and its pin 91 will move to a position to move member 103 and cable 104 to the lockup position thus moving selector 150 to its lockup position exhausting fluid pressure from chamber 73 and allowing spring 74 to provide engagement of the positive driving clutch 23. Thus the embodiment of FIG. 4 provides a control system in which there is no governor control or other electric controls such that the overdrive position selected by the operator will be obtained as soon as vehicle speed is such to provide pressure from the pump to engage the overdrive brake and the transmission will remain in overdrive unless handle 84 is moved from the overdrive position or if the kickdown button 200 is actuated.

In addition to the above modification, the transmission control can be constructed such that the manual control or handle 84 is connected directly to selector valve 150 and such an embodiment again eliminates the electric control system. This would be a truly manual version of the overdrive control in that the transmission would be conditioned for overdrive or lockup operation without a kickdown function provided and again the transmission would provide overdrive ratio when overdrive is selected by handle 84 and when the pump obtains sufficient speed to provide adequate fluid pressure to move the shift valve 65 out of its clutch engaging position to its position admitting fluid pressure to brake 22 to engage the overdrive brake. This embodiment is not illustrated since it would merely comprise a direct connection of cable 85 to the manual selector 150 with the elimination of the control block 86.

I claim:
1. An overdrive transmission assembly for a vehicle comprising a planetary gear set having an input shaft and an output shaft, a positive clutch operatively associated with said planetary gear set and adapted to establish a 1:1 drive ratio therethrough when engaged, a friction brake operatively associated with said planetary gear set and adapted to establish an overdrive ratio through said planetary gear set when engaged, a one-way clutch operatively associated with said planetary gear set and adapted to establish a one-way 1:1 drive ratio through said planetary gear set when both said brake and clutch are disengaged; control means operative to determine the drive ratio established in said planetary gear set; said control means including a source of fluid pressure, a fluid operated shift means, and a selector valve for directing the fluid pressure to said shift means for selective control thereof at the will of the operator; and said shift means having a position engaging said positive clutch to establish said 1:1 drive ratio, and another position in which said positive clutch is disengaged and either said one-way clutch or said brake is engaged.

2. A combination overdrive transmission and differential assembly for a vehicle in which the overdrive transmission is adapted to be directly connected to the differential assembly comprising a planetary gear set having an input shaft and an output shaft, the output shaft being drivingly connected to the driving pinion gear of the differential, a positive clutch operatively associated with said planetary gear set and adapted to establish a 1:1 drive ratio therethrough when engaged, a friction brake operatively associated with said planetary gear set and adapted to establish an overdrive ratio through said planetary gear set when engaged, a one-way clutch operatively associated with said planetary gear set and adapted to establish a one-way 1:1 drive ratio through said planetary gear set when both said brake and clutch are disengaged, control means operative to determine the drive ratio established in said planetary gear set, said control means including a source of fluid pressure, a fluid operated shift means, and a selector valve for directing the fluid pressure to said shift means for selective control thereof at the will of the operator, and said shift means having a position engaging said positive clutch to establish said 1:1 drive ratio, and another position in which said positive clutch is disengaged and either said one-way clutch or said brake is engaged.

3. A combination overdrive transmission and differential assembly for a vehicle in which the overdrive transmission is adapted to be directly connected to the differential assembly comprising a planetary gear set having an input shaft and an output shaft, the output shaft being drivingly connected to the driving pinion gear of the differential, a positive clutch operatively associated with said planetary gear set and adapted to establish a 1:1 drive ratio therethrough when engaged, a friction brake operatively associated with said planetary gear set and adapted to establish an overdrive ratio through said planetary gear set when engaged, a one-way clutch operatively associated with said planetary gear set and adapted to establish a one-way 1:1 drive ratio through said planetary gear set when both said brake and clutch are disengaged; control means for selectively engaging said clutch, disengaging said clutch and said brake, or engaging said brake only; said control means including a fluid operated shift means, a source of fluid pressure, a selector valve for directing the fluid pressure to said shift means for selective control thereof, said selector valve being automatically controlled by vehicle speed responsive means.

4. An assembly in accordance with claim 3 including means responsive to engine load as indicated by the intake manifold vacuum and automatically controlling the selector valve.

5. An assembly in accordance with claim 3 wherein movement of said selector valve is by way of a cable.

6. An assembly in accordance with claim 5 wherein said cable is controlled by a solenoid.

7. An assembly in accordance with claim 3 wherein said vehicle speed is indicated by a governor driven in accordance with vehicle speed.

8. A combination overdrive transmission and differential assembly for a vehicle in which the overdrive transmission is adapted to be directly connected to the differential assembly comprising a planetary gear set having an input shaft and an output shaft, the output shaft being drivingly connected to the driving pinion gear of the differential, a positive clutch operatively associated with said planetary gear set and adapted to establish a 1:1 drive ratio therethrough when engaged, a friction brake operatively associated with said planetary gear set and adapted to establish an overdrive ratio through said planetary gear set when engaged, a one-way clutch operatively associated with said planetary gear set and adapted to establish a one-way 1:1 drive ratio through said planetary gear set when both said brake and clutch are disengaged; control means for selectively engaging said clutch, disengaging said clutch and said brake, or engaging said brake only; said control means including a fluid operated shift means, a source of fluid pressure, a selector valve for directing the fluid pressure for selective control thereof, said brake adapted to be applied by fluid and released by a spring, said brake having multiple disks and receiving its apply pressure from said source through said selector valve, said shift means controlling the engagement and disengagement of said clutch, means urging said shift means to its clutch engaging position and means responsive to pressure to urge said shift means in the opposite direction, said pressure being routed from said source through said selector valve to said shift means, the control of said selector valve being automatically responsive to vehicle speed and engine load.

9. An assembly in accordance with claim 8 wherein said selector valve provides lubricating fluid to said brake.

10. A control system for a planetary transmission having a friction engaging mechanism and an engageable torque transmitting mechanism each adapted to establish a drive ratio through said transmission and including a source of fluid pressure, a regulator valve connected to said source of pressure, a manual valve and a shift valve, said shift valve being connectible to said source of pressure through said manual valve, said shift valve having a direct connection with said torque transmitting mechanism, said shift valve having two positions, and a spring urging said shift valve to a first position to establish a ratio in said planetary transmission and said shift valve being moved into said other position by fluid pressure from said manual valve to inactivate said drive ratio provided by said first position, said shift valve in said second position being adapted to establish a fluid path to said friction-engaging mechanism whereby a second drive ratio through said transmission may be established by fluid pressure communicated to said friction mechanism through said shift valve.

11. A transmission as claimed in claim 10 wherein said source of pressure is inoperative when the transmission is at rest whereby said spring will return said shift valve to its first position.

12. A transmission as claimed in claim 10 wherein said manual valve has a position establishing a fluid path to said friction engaging mechanism and fluid interlock means on said shift valve whereby said manual valve can communicate pressure to said friction mechanism only when said shift valve is in said second position.

13. A transmission mechanism having engageable means therein each adapted to establish a particular drive ratio when engaged, a manual control for said transmission, a control mechanism for said transmission connected to said manual control, means comprising a cable connecting said control mechanism to said transmission, a solenoid in said control mechanism and operatively connected to said connecting means, urging means associated with said connecting means adapted to move said connecting means to a first position to establish one of said drive ratios through said transmission, said solenoid when actuated allowing said connecting means to move to said first position, blocking means connected to said maual control and movable thereby to a position preventing movement of said connecting means to said first position.

References Cited

UNITED STATES PATENTS

| | | | |
|---|---|---|---|
| 2,399,097 | 4/1946 | Carnagua | 74—781 |
| 2,946,240 | 7/1960 | Kop | 74—781 |
| 2,971,395 | 2/1961 | Orr | 74—781X |
| 3,126,765 | 3/1964 | Conkle | 74—781 |
| 3,217,846 | 11/1965 | Smirl | 74—781X |

ARTHUR T. McKEON, Primary Examiner

U.S. Cl. X.R.

74—752, 781